No. 802,701. PATENTED OCT. 24, 1905.
G. A. LOWRY.
TYING DEVICE FOR BALES OF HAY, COTTON, &c.
APPLICATION FILED NOV. 15, 1901.
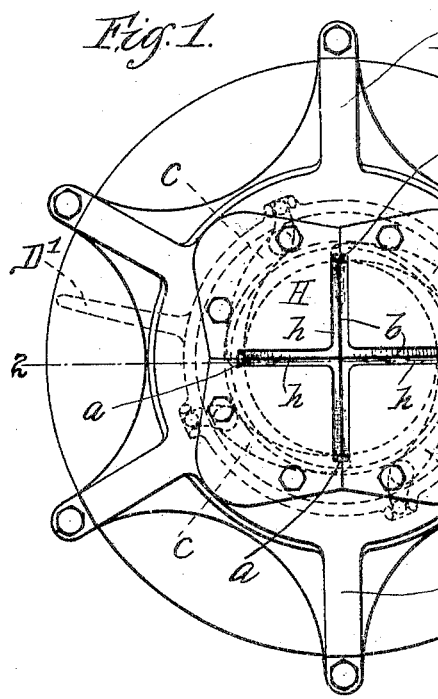
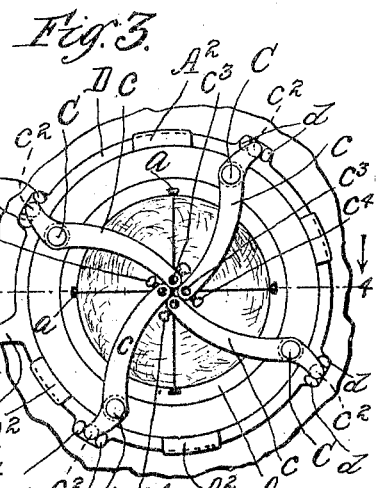
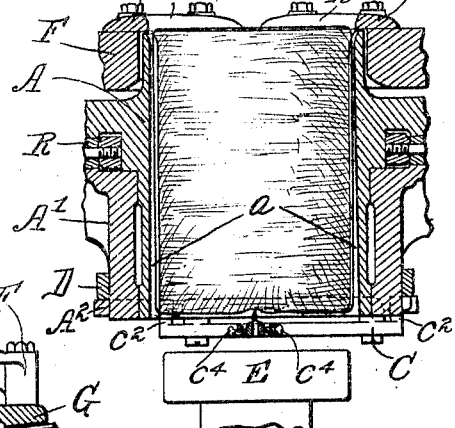
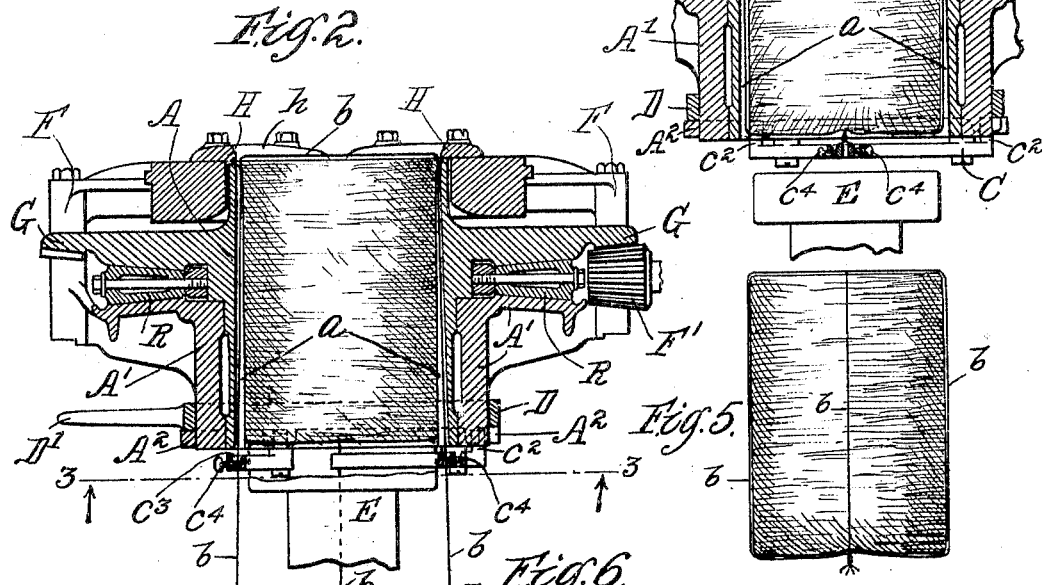
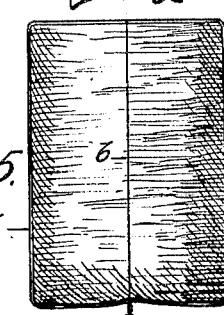
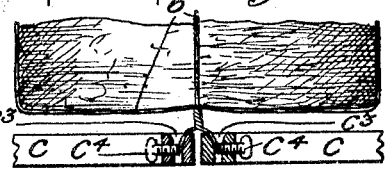
Witnesses
Wm. M. Rhean
Joseph T. Brennan
Inventor
George A. Lowry
by Olin R. Mitchell
Att'y

UNITED STATES PATENT OFFICE.

GEORGE A. LOWRY, OF CHICAGO, ILLINOIS, ASSIGNOR, BY MESNE ASSIGNMENTS, TO PLANTERS COMPRESS COMPANY, A CORPORATION OF MAINE.

TYING DEVICE FOR BALES OF HAY, COTTON, &c.

No. 802,701. Specification of Letters Patent. Patented Oct. 24, 1905.

Application filed November 15, 1901. Serial No. 82,359.

*To all whom it may concern:*

Be it known that I, GEORGE A. LOWRY, a citizen of the United States, residing at Chicago, in the county of Cook and State of Illinois, have invented a new and useful Improvement in Tying Devices for Bales of Hay, Cotton, or other Material, of which the following is a specification, reference being had to the accompanying drawings.

The object of the invention is to provide simple means for binding permanently bales of hay, cotton, or other material and means whereby permanent binding-ties may be applied to the bale before removal thereof from the compressing apparatus without the use of temporary stays or ties.

Referring to the drawings, Figure 1 is a view in plan of one type of compressing apparatus in connection with which my invention may be employed and showing the application of a bale-tying device embodying my invention. Fig. 2 is a sectional view of the same on the line 2 2 of Fig. 1. Fig. 3 is a broken view in bottom plan on plane indicated on the line 3 3, Fig. 2, looking in the direction of the arrows, showing the bale-tying devices in position for performing their final function. Fig. 4 is a broken view similar to Fig. 2, but taken on the line 4 4 of Fig. 3. Fig. 5 is an elevation of a completed bale tied in accordance with my invention. Fig. 6 is an enlarged broken view in side elevation similar to Fig. 4.

The same part is designated by the same reference-sign wherever it occurs throughout the several views.

In the drawings I have shown my invention as applied to a compressing apparatus of the type commonly known in the art as the "Lowry" press. A description of this general type may be seen in Patent No. 630,369, issued to me August 8, 1899. In presses of this type the material is packed into bales built up endwise of compressed layers. The layers are formed in the press shown in the patent referred to by drawing the material to be baled through one or more slots in a head-plate and into one end of a baling or compression chamber. As the fibers of the material are drawn through the slot they become superposed on the body of compressed material that has previously passed into the compression-chamber and are compressed between such body and the inner side or surface of the head-plate. The head-plate and compression-chamber are mounted for relative movement, and by reason of such relative movement the end surface of the compressed mass in the compression-chamber travels past the slot, which thus deposits the entering layer of fibers evenly over such end surface, thereby covering the material previously introduced into the compression-chamber, the new layer being in turn covered by the next succeeding layer as the operation of the machine progresses. In this manner a column of compressed material is built up endwise, from which portions of proper length to form commercial bales may be detached and tied to prevent expansion.

Heretofore it has been the usual custom to apply temporary bale staying or tying devices to the detached portion before the removal thereof from the compressing apparatus, and subsequently apply the permanent ties or tie-wires by hand after the bale has been removed from the compressing apparatus, the permanent ties or tie-wires being also tightened and fastened by hand. This necessitates the employment of labor and additional expense therefor and for the temporary bale-staying devices and also the expenditure of considerable strength in applying the permanent bale-stays or the tie-wires to the removed bale and in drawing such ties or wires tight upon the bale. The special purpose of the present invention is to provide means for applying the permanent ties or wires to the bale before it is removed from the compressing apparatus, so that when the bale is removed from the compressing apparatus it is complete and ready to be shipped, thus avoiding the necessity of employing temporary bale-staying devices or the labor required to apply and remove the same and to apply the permanent staying devices, and, moreover, to secure a more efficient application of the permanent bale-staying devices mechanically and automatically without the expenditure of manual labor therefor.

In carrying out the principles of my invention I propose to apply the permanent bale stay bands or wires to a sufficient portion of the compressed column to form a bale before such portion is removed from the compressing apparatus, and in practice I propose to employ one or more binding-stays or tie-wires and to pass the same transversely across the compressed column and with the ends of such stays or wires extending longitudinally of the compressed column and a sufficient distance past or beyond the other end of the portion of the compressed column which is to form the bale to enable such projecting ends of the stays or wires to be brought together and twisted or otherwise secured together, so as to tighten such stays or wires in permanent relation around the portion of compressed column to form the completed bale. This portion is then ready to be removed from the compressing apparatus and when removed is ready to be shipped without further handling or staying.

Referring to the accompanying drawings, reference-sign F designates the framework of the compressing apparatus, H the cap or head-plate, and A the compression-chamber. The cap or head plate and the compression-chamber are mounted for relative movement. For instance, in the particular form shown, to which, however, the invention is not limited, the head-plate is supported stationarily upon the frame F, while the compression-chamber A is mounted for rotation relatively thereto, said chamber being provided with a flange arranged to rest upon antifriction-rollers R, supported by a casing A', within which the compression-chamber A is journaled, the casing A' forming part of the framework of the machine. Relative rotation may be imparted to the compression-chamber and cap or head plate in any suitable or convenient manner—as, for instance, by means of a pinion F', suitably driven from a convenient source and arranged to engage rack-teeth formed on or connected with a flange G of the compression-chamber. The inner wall of the compression-chamber is provided with longitudinal grooves or scores $a$. These grooves or scores may be of any suitable or convenient shape and cross-section. In practice, however, I prefer to employ scores or grooves of dovetail shape and cross-section, as shown in Fig. 3. The cap or head plate is provided with the usual feed-slots $h$, through which the material to be compressed is drawn into the compression-chamber. These feed-slots should be of sufficient length for the outer ends thereof to be brought into registering relation with respect to the longitudinal scores or grooves $a$, formed in the inner surface of the compression-chamber, as clearly shown in Fig. 1. Any desired number of longitudinal scores or grooves may be formed in the inner surface of the compression-chamber, the number depending upon the number of permanent binding stays, bands, or wires to be applied to the bale. In the particular form shown, to which, however, my invention is not limited, four of such scores or grooves are employed, said scores or grooves being arranged in pairs, the members of each pair occupying diametrically opposite positions with respect to each other, and similarly I have shown four feed-slots in the cap or head plate. It is obvious, however, that any other number of pairs of scores or grooves may be employed, as may be desired, and any desired number of feed-slots in the cap or head plate may be used.

From the foregoing description it will be seen that when a sufficient length of compressed column of material has been formed in the operation of the compressing apparatus to produce a commercial bale of the required length feed-slots in the cap or head-plate are brought into proper position and relation for the outer ends thereof to register with longitudinal scores or grooves in the compression-chamber. It is to be understood that the feed-slots in the head-plate or cap open into each other at or adjacent to the geometrical center of the head or cap plate, and when the outer ends of diametrically opposite feed-slots are brought into registering relation with respect to diametrically opposite members of coöperating pairs of scores or grooves in the inner periphery of the compression-chamber binding stays, bands, or wires may be initially applied to the compressed column of material by bending the same into substantially U-shape and passing the two ends thereof into and through the longitudinal scores or grooves in the compression-chamber, the entry into such scores or grooves being afforded by the registration of the outer ends of the feed-slots in the cap or head plate with such scores or grooves. It will also be seen that a portion of each binding strap or wire will occupy the length of diametrically opposite slots in the head plate or cap and will extend transversely across the end of the compressed column which is in contact with the inner surface of the head-plate and that the ends of each binding strap or wire will extend longitudinally of the compressed column. These ends should be of sufficient length to project beyond the other end of the compressed column a distance sufficient to enable such projecting ends to be brought together in transverse relation across such end of the compressed column to be twisted or otherwise secured together.

Reference-sign $b$ designates a binding stay or wire and is shown in Figs. 1 and 2 in position for the projecting ends thereof to be brought together across the front or advancing end of the compressed column, as above described. These ends of the binding stays or wires may be brought together and tightened about the bale in many specifically different ways, and they may be secured together in many specifically different manners. I have shown and will now describe one form of means for accomplishing this object and the best form in which I at present contemplate carrying my invention into operation; but I do not desire to be limited or restricted thereto, as many variations therefrom and changes therein would readily occur to persons skilled in the art and still fall within the spirit and scope of my invention. In the particular form shown the ends of the binding stays or wires are brought together at the center of the front or advancing end of the compressed column and twisted together, though it is obvious that they may be otherwise suitably secured. In the form shown I employ a series of levers $c$, pivotally mounted, as at C, upon the framework of the machine and each provided at one end with a lug $c^2$, engaged by a pair of lugs $d$ on a ring D, which surrounds the baling-chamber and is supported in bearings $A^2$, which permit a slight rotative movement of the ring around the baling-chamber, but prevent it from moving in the direction of the axis of the compressed column. Slight rotation of the ring—as, for instance, by a handle D'—swings the levers $c$ on their pivots C, thus throwing their free ends in toward or out from the axis of the column, Figs. 3, 4. These swinging ends are provided with means, which may be of any suitable form, for receiving the ends of the binding-stays. Thus in the machine illustrated each lever $c$ has an opening $c^3$ so arranged that it can be made to register with one of the grooves $a$ in the compression-chamber walls. (See dotted lines in Fig. 1 and full lines in Fig. 2.) Suitable means may be provided at these openings $c^3$ for gripping the ends of stays or wires which are to be the permanent binders when the same have been pushed through the grooves $a$ by insertion from the head-plate end thereof, and I prefer to employ a gripping device which will hold the stay until the tension reaches a certain degree and will then permit the stay to slip through it, thus gripping the stay yieldingly. In the particular form shown, to which, however, my invention is not limited, I employ set-screws $c^4$, by adjustment of which the frictional grip on the stays may be adjusted.

The operation is as follows: The compressing apparatus is started up in the usual manner until a compressed column of the desired length to form a commercial bale has been produced. The compressing apparatus is then arrested, with the outer ends of the slots in the cap or head plate in registering relation with respect to the grooves or scores in the inner surface of the compression-chamber, and the gripping ends of the arms or levers $c$ are also brought into the same registering relation. The binding stays, straps, or wires are then applied by passing the ends thereof longitudinally through opposite members of the pairs of grooves $a$ and through the gripping-jaws of the corresponding levers or arms $c$, Figs. 1, 2. The gripping arms or levers $c$ are then actuated to draw the projecting ends of the bands, straps, or wires to the center, as shown in Fig. 3, thereby tightly stretching and applying such straps, bands, or wires upon and to the compressed column. The operation of the compressing apparatus is then resumed, the rotation of the compression-chamber serving to effect a twisting of the ends of the binding stays, straps, or wires together, said ends being held in the ends of the arms or levers. In this operation the portions of the wires, straps, or bands $b$ which lie in the slots of the head-plate are drawn tight upon the end of the compressed material by the inward movement of the twister jaws or arms and being held by grooves in the compression or baling chamber are carried in under the head-plate when the relative rotation of the chamber and head-plate is again started. The amount of tension upon the wires, straps, or bands during the inward movement of the gripping-arms depends upon the adjustment of the gripping-jaws. This adjustment should be so regulated that a sufficient power will be exerted upon the wires to take up the slack thereof and to apply the wires with sufficient or the desired tension about the compressed material. The yielding character of the grip of the levers on the wires permits the wires to slip through the grip if the tension becomes so great as to cause danger of breaking the wires. After the twisting operation has been completed the gripping-jaws are loosened by the operator and the twister-arms are swung outward, and it only remains to remove the completed and wired bale from the compressing apparatus. This is accomplished by resuming the compressing operation—that is, by supplying additional material to be compressed through the slots in the head-plate, the addition of which to the compressed column advances the portion that has been tied off through the compressing apparatus. When the completed bale has been sufficiently advanced, the plunger E—if the press be one of the type that employs such a plunger—is sufficiently withdrawn for the bale to be tumbled out. By the time this point in the operation occurs a sufficient length of compressed material has been formed to produce another commercial bale, and while the plunger is being replaced in engagement with the advanced or front end of the compressed column remaining after a tied bale has been removed or ejected the binding stays, bands, or wires for the next succeeding bale may be applied in the manner above described, and the supply of material into the compressing apparatus is then continued, as above explained.

The tendency of the compressed material to expand during the operation of the tying and twisting mechanism may be restrained in any suitable or convenient manner—as, for instance, by friction of the material against the inner walls of the compression-chamber.

It is obvious, however, that other means of restraining this expansion may be employed.

From the foregoing description it will be seen that I produce a compressing apparatus and means for applying the permanent binding stays, wires, or bands to the compressed material which is exceedingly simple in construction, wherein the necessity for the provision of special means for temporarily tying or staying, removing, and handling the bales before they receive their permanent stays or binding-wires is avoided, thereby greatly reducing the cost of construction, simplifying the foundation required for the machine, and enabling the machine to be constructed in convenient form to be portable, and consequently adapted for use in many places where it would not otherwise be available because of the requirements for suitable foundation.

Many variations and changes in the form of construction and arrangement would readily suggest themselves to persons skilled in the art and still fall within the spirit and scope of my invention. I do not desire, therefore, to be limited or restricted to the exact details shown and described, and while I have shown my invention as applied and adapted to tying a round bale before removal from the compressing apparatus, and which is the preferred form in which I propose to employ the invention, I do not desire to be limited in this respect, as the principles thereof may be applied to many other bales or packages.

I claim—

1. In an apparatus of the class described, the combination of means constructed to permit the application of a binding wire, stay or band to a bale or package, means for engaging the ends of the applied wire, stay or band, and means for rotating the bale or package, whereby the ends of the wire, stay or band are twisted together, as and for the purpose set forth.

2. In an apparatus of the class described, the combination of means constructed to permit the application of a binding wire, stay or band to a bale or package, gripping devices arranged to engage the ends of the applied wire, stay or band, said gripping devices adapted to permit said ends to slip therethrough, and means for relatively rotating said gripping devices and the bale or package, as and for the purpose set forth.

3. In an apparatus of the class described, the combination with means constructed to permit the application of binding wires, stays or bands loosely to a bale or package, of gripping devices arranged to engage the ends of said wires, bands or stays while loose, means for bringing said gripping devices toward a common point to tighten the wires, bands or stays about the bale or package, and means for securing the ends of the tightened wires, bands or stays, as and for the purpose set forth.

4. In an apparatus of the class described, a compressing apparatus including a slotted cap or head plate, means for relatively moving the compressed material and said headplate, and means constructed to permit the application of the permanent binding-wires to the compressed material before removal thereof from the compressing apparatus, as and for the purpose set forth.

5. The combination with a compressing apparatus including a relatively moving compression-chamber and slotted cap or head plate therefor, of means constructed to permit the application of the permanent binding-wires to the compressed material before removal of the same from the compressing apparatus, as and for the purpose set forth.

6. A compressing apparatus including a slotted cap or head plate, the slots in said cap or head plate extending outwardly beyond the sides of the compressed material, whereby binding wires, stays or bands may be passed through the outer ends of said slots for application to the compressed material without removing the latter from the compressing apparatus, as and for the purpose set forth.

7. The combination with a compression-chamber of a slotted cap or head plate therefor, these parts being mounted for relative rotation, the whole constructed to admit binding-wires adapted to be applied to the compressed material through said slots and chamber without removal of the compressed material, as and for the purpose set forth.

8. The combination with a compression-chamber of a slotted cap or head plate therefor, these parts being mounted for relative rotation, said chamber having longitudinal scores or grooves on the inner surface thereof, whereby binding wires, stays or bands may be received through said slots and scores or grooves whereby the compressed material may be tied before removal thereof from said chamber, as and for the purpose set forth.

9. The combination with a compression-chamber of a slotted cap or head plate, these parts being mounted for relative rotation, whereby binding-wires may be applied to the compressed material through said slots and chamber, and means for tightening said wires around the compressed material and securing the same, as and for the purpose set forth.

10. The combination with a compression-chamber having longitudinal guideways, of a cap or head therefor, said cap or head having transverse passages and having intersecting relation with respect to the longitudinal guideways in said compression-chamber, as and for the purpose set forth.

11. The combination with a compression-chamber having longitudinal guideways, of a cap or head therefor having openings therethrough, said openings intersecting said guideways, as and for the purpose set forth.

12. A wire tightening and fastening device comprising means for grasping the several free ends of a multiplicity of wires which partially surround the bale or package, means for drawing those ends together toward a common point when thus grasped, and means to cause the bale and grasping devices to rotate relative to one another thereby fastening the wires, as and for the purpose set forth.

13. A wire tightening and fastening device comprising means for grasping the several free ends of wires partially surrounding a bale or package, arms to support those grasping means, means to draw those arms together toward the axis of the bale, and means to produce relative rotation between the grasping devices and the bale or package thus bound by the wires whereby the wires may be fastened, as and for the purpose set forth.

14. A wire tightening and fastening device comprising means for yieldingly grasping the several free ends of wires surrounding a bale or package, arms to support those grasping means, means to draw those arms together, and means to produce relative rotation between the grasping devices and the bale or package thus bound by the wires whereby the wires may be fastened, as and for the purpose set forth.

15. A wire tightening and fastening device comprising gripping devices adapted to grasp yieldingly the several free ends of wires partly surrounding a bale or package, arms to support those gripping devices, said arms being adapted to have their gripping ends brought near together, and means to fasten the wires when thus drawn together, as and for the purpose set forth.

16. A wire tightening and fastening device comprising means for drawing the ends of wires which partially surround the bale toward a common point, means for holding them in that position, and means rotating the bale and with it the remaining parts of wire surrounding the bale or package, as and for the purpose set forth.

17. In combination with a baling-press, means constructed to permit surrounding loosely with tie-wire three sides of the compressed material contained therein, gripping devices arranged to engage the free ends of the wire, means to move the gripping devices toward a common point on the fourth side of the bale thereby tightening the wires, and means to fasten the several ends together at that point, as and for the purpose set forth.

18. The combination with a baling-press, means constructed to permit surrounding loosely three sides of the compressed material contained therein with tie-wires, gripping devices adapted to engage the free ends of the wires, means to move the several gripping devices toward a common point on the fourth side of the bale thereby tightening the wires, means to hold the gripping devices firmly in that position, and means to produce relative rotation between those gripping devices and the parts of the wires that surround the bale, whereby the wires are fastened, as and for the purpose set forth.

19. In a baling-press, a baling-chamber, a head-plate at one end of the baling-chamber, a slot or opening in said head-plate extending across the head end of the baling-chamber, grooves in the walls of the baling-chamber, a multiplicity of arms pivoted adjacent to the discharge end of the baling-chamber, wire-gripping devices carried by said arms, said gripping devices, grooves and opening in head-plate being adapted to register together, means to project the gripping portions of said arms to points near the center of the discharge end of the baling-chamber, and means to produce relative rotation between the baling-chamber and those gripping devices, as and for the purpose set forth.

20. In a baling-press, a baling-chamber, a head-plate therefor, openings therethrough reaching across the baling-chamber, longitudinal grooves in the walls of the baling-chamber, adapted to register with the ends of said openings and to receive baling-wires therethrough, and means to thrust the ends of such wires in toward the axis of the baling-chamber on the fourth side thereof and there retain them, as and for the purpose set forth.

21. In a bale-tying device, means to hold the bale, a multiplicity of gripping devices disposed about the bale and adapted to seize the binding-wires thereof before the wires are drawn taut, levers adapted to support those gripping devices and to project the same from said initial positions to a central position adjacent to one side of the bale, means to operate those levers, and means to produce relative rotation between the bale and the gripping devices when in the central position, whereby the wires are tied, as and for the purpose set forth.

22. In a baling-press, compressing devices, including a head-plate having slots through which material to be compressed is fed, adapted to bear against a column of compressed material, means for producing relative rotation of the plate and column, and means to resist expansion of the material, in combination with means to tie a portion of the column while under compression in the press, as and for the purpose set forth.

23. In a baling-press, compressing devices, including a head-plate having slots through which material to be compressed is fed, adapted to bear against a column of compressed material, means for producing relative rotation of the plate and column, and means to tie a portion of the column while under compression, in combination with means operating on a tied portion to restrain expansion of a portion not tied, as and for the purpose set forth.

24. In a baling-press, compressing devices, including a head-plate having slots through which material to be compressed is fed, adapted to bear against a column of compressed material, means for producing relative rotation of the plate and column, and means constructed to permit surrounding with tie-wires a portion of the column while under compression in the press and means to tie the same against expansion, as and for the purpose set forth.

25. In an apparatus of the class described, a compressing apparatus including a slotted cap or head plate, means for relatively moving the compressed material and said head-plate and gripping-arms to draw binding-wire about the bale and secure it before removal thereof from the compressing apparatus, as and for the purpose set forth.

26. In a baling-press, compressing devices, including a slotted head-plate adapted to bear against a column of compressed material, means for producing relative rotation of plate and column, means to resist expansion of the compressed material, said slots being constructed to admit a binding-wire laid through said slotted head-plate and means to draw said wire about the bale and secure it before removal thereof from the compressing apparatus, as and for the purpose set forth.

27. In an apparatus of the class described, a compressing apparatus including a slotted cap or head plate, means for relatively moving the compressed material and said head-plate, said slots being constructed to admit a binding-wire laid through said slot and means to draw said binding-wire about the bale and secure it before removal thereof from the compressing apparatus, as and for the purpose set forth.

28. The combination of a compressing apparatus including a slotted cap or head plate, the slots in said cap or head plate extending outwardly beyond the sides of the compressed material, and being constructed to admit binding wires, stays or bands passed through said slots for application to the compressed material without removing the latter from the compressing apparatus, as and for the purpose set forth.

29. The combination with a compression-chamber of a slotted cap or head plate therefor, these parts being mounted for relative rotation, and constructed to admit binding-wires applied to the compressed material through said slots and chamber without removal of the compressed material, as and for the purpose set forth.

30. The combination with a compression-chamber having longitudinal scores or grooves on the inner surface thereof of a slotted cap or head plate therefor, the whole constructed to admit binding wires, stays or bands applied through said slots and scores or grooves whereby the compressed material may be tied before removal thereof from said chamber, as and for the purpose set forth.

31. The combination with a compression-chamber and a slotted cap or head plate, these parts being arranged for relative rotation, and constructed to admit binding-wires applied to the compressed material through said slots and chamber, and means for tightening said wires around the compressed material and securing the same, as and for the purpose set forth.

In witness whereof I hereunto set my hand, this 11th day of November, 1901, in the presence of the subscribing witnesses.

GEORGE A. LOWRY.

Witnesses:
RAPHAEL G. BLANC,
EVERETT E. KENT.